3,794,505
METHOD OF PRODUCING CALCIUM SILICATE
HYDRATE INSULATION MATERIAL DEVOID
OF ASBESTOS
Jerry L. Helser, Hebron, and Richard F. Shannon, Lancaster, Ohio, assignors to Owens-Corning Fiberglas Corporation
No Drawing. Filed Apr. 28, 1972, Ser. No. 248,376
Int. Cl. C04b 1/00
U.S. Cl. 106—119
8 Claims

ABSTRACT OF THE DISCLOSURE

A dispersion of reactive CaO and reactive $SiO_2$ ingredients are mixed with water into a dispersion stabilized by stable dispersion producing cellulose fibers having an average diameter of less than approximately ten microns, and from 0.30 to 2% by weight of total solids of an aluminum hydroxide gel forming material. The dispersion is heated to a temperature between 180 and 210° F. for more than ½ hour to cause some of the silica to be dissolved and reacted with the CaO into a hydrated calcium silicate gel having a CaO to $SiO_2$ ratio of approximately 2.0. The gel dispersion is thereafter steam autoclaved for a sufficient amount of time to solubilize substantially all of the remaining $SiO_2$ and to convert the calcium silicate gel into a calcium silicate hydrate which is stable above 600° F. and which has an $SiO_2$ to CaO ratio of approximately 0.95 or more.

BACKGROUND OF THE INVENTION

Calcium silicate hydrate reinforced with asbestos fibers have been known and used as high temperature insulation materials since the time of the Kalousek U.S. Pat. 2,665,996. It later developed that some people were allergic to asbestos fibers, and there has been a lot of study since the original Kalousek development in attempts to find a commercially producible insulation material that is devoid of asbestos fibers. Conventional glass fibers and rockwool have not been found suitable, apparently because they will not withstand the action of the lime during autoclaving, and cellulose fibers have not been thought acceptable because they burn out at temperatures above approximately 600° F.

The Kalousek Pat. 2,665,996 describes a process wherein the materials after mixing at room temperature are put immediately in an autoclave. All commercially acceptable processes, however, require a prolonged gelation step at temperatures below 210° F. prior to the autoclaving step. A great number of competing complicated reactions are involved in producing calcium silicate hydrates, and the gelation step causes the results achieved by commercial processes to differ drastically from those processes which do not include a gelation step below 210° F.

Three general types of commercial processes have been developed for making calcium silicate hydrate products. One such commercial process is the pan-pouring process, the second commercial process is the filter-press process, and the third commercial process is the extrusion process of U.S. Pat. 2,904,444. In the pan-pouring process, the water dispersion of ingredients is poured into molds which are then moved by trucks a number of times before they are put into the autoclaving cylinder. The slurry in the molds must be kept level with the top of the mold if products of commercial tolerance are to be produced. In order to prevent the slurry from being "slopped" out of the mold during movement, the slurry must be gelled to a generally solid state. In all commercial pan-pouring processes therefor, the molds after being filled and leveled, are heated with steam at atmospheric pressure to solidify the slurry prior to the time that the molds are loaded into the indurating cylinder.

In the filter-press process of making commercial insulation, the slurry is heated to produce a hydrated calcium silicate gel of high water content which is then filter pressed to remove excess water and form the desired shape. Obviously in this process, we must form a gel, because if the solids are removed from the slurry without forming a gel, the product will not retain water between the solid reactants and will give a product of too high a density. The filter-press process is described in U.S. Pat. 2,699,097.

In the extrusion process described in Pat. 2,904,444 the materials are mixed together and heated for a predetermined period of time to give incipient gelation. The material is immediately put into a mold where gelation takes place, and following which the gelled material is extruded from the mold.

The art has long attempted to produce this kind of product using a dispersion of cellulose fibers in processes that include the gelation step, but all such attempts, prior to the present invention, have resulted in a product that had far less strength than equivalent products when made using asbestos fibers. Prior to the present invention, the art has not known why cellulose fibers give a product having poor strength, but it was thought that the lack of strength was due to the physical differences between cellulose fibers and asbestos fibers. It has long been known that asbestos fibers are fern-like in that they are highly branched, whereas cellulose fibers are more rod-like.

The reactions involved in the formation of calcium silicate hydrates are varied and complex. One very vital reaction involves the calcium hydroxide attack of the silica or quartz at elevated temperatures to dissolve the solid silica. Another reaction that is involved is the chemical reaction between CaO and the dissolved silica so produced to form a gel that generally comprises

$$2CaO.SiO_2.XH_2O$$

Another reaction involves the vital crystalline growth of the initially formed gel. Still another reaction involves the diffusion of silica into the initially formed $2CaO.SiO_2$ gel structure to change its molecular composition into a calcium silicate of a lower CaO to $SiO_2$ ratio. The dissolving of the silica can only take place in a high concentration of hydroxyl ions, and this is not believed to be produced by the calcium silicate hydrates themselves.

The principal object of the present invention therefore is the provision of a calcium silicate hydrate insulation product made by a commercial process which utilizes the gelation step and which is as strong or stronger than prior art insulation material comprising asbestos fibers.

Applicants have discovered that when a relatively pure aluminum hydroxide forming material is incorporated into a calcia-silica-cellulose fiber dispersion prior to the complete gelatinization thereof, a much stronger product is achieved than when the aluminum hydroxide forming material is not used or is used at too small a concentration. All of the reasons why this is so are not understood, but it is believed that aluminum hydroxide as produced for example by a pure aluminum salt, produces an aluminum hydroxide gel that acts as a partial barrier between some of the particles of silica and some of the hydrated lime of the slurry. This aluminum hydroxide gel allows the hydroxyl ions from the hydrated lime to pass through the aluminum hydroxide gel and concentrate on the solid $SiO_2$ particles. This allows some of the silica to go into solution which thereafter diffuses through the gel to areas where it is contacted by the CaO, and the reaction of the CaO and $SiO_2$ takes place. Some of the alumina gel may also surround the particles of the CaO, so that both CaO and $SiO_2$ endure the gelation step and are present when the gelled material is put into the autoclaving cylinder. Once in the autoclaving cylinder, the presence of unreacted lime products the high hydroxyl concentrations necessary for the dissolving of the remaining $SiO_2$.

It is now theorized that when asbestos-free materials are suspended by cellulose fibers without the aid of an alumina hydroxide gel, more than half of the $SiO_2$ is solubilized during the gelation step, and that simultaneously therewith this dissolved silica is reacted with the total available CaO to give a product that is predominantly $2CaO.1SiO_2.XH_2O$. When all of the gel is this material, it will be seen that all of the lime has been consumed and that only one half the silica has been dissolved. When such a product is then placed in the autoclave or induration cylinder, $Ca(OH)_2$ does not exist to provide the high hydroxyl concentrations necessary for the dissolving of the remaining silica. Such a process therefore does not convert the hydrated particles into crystals having an $SiO_2$ content equal to or greater than the CaO content, as is required to produce strong products.

It is further theorized that this problem was never experienced with asbestos containing products, because the asbestos fibers are so highly fibrilated or branched as to form a physical barrier around particles of the silica and the lime which greatly reduces the rate of reaction to preserve $Ca(OH)_2$ through the gelation process. The discovery is significant that when a proper balance of a gel forming hydratable form of alumina and/or gel softening materials are present, an alumina gel is produced which preserves $Ca(OH)_2$ throughout gelation without overly restricting the formation of the calcium silicate gel. The use of the alumina gel barrier during gelation makes it possible to make a product using cellulose fibers which is as strong or stronger than the product produced heretofore using asbestos fibers. Although the above reaction differences are theorized, they are believed to explain the previously unexplained differences between the results sought by prior processes and the results actually obtained by commercial processes when cellulose fibers are used.

It must also be explained that compounds containing already combined forms of aluminum do not perform the function required in the present invention. The prior art has long used clay as a thickening agent to help keep the particles of silica and CaO in suspension. Such combined or impure forms of alumina do not produce the barrier required in the present invention. Alumina containing clays have been thought to contribute alumina as a promoting agent for the crystalline growth of the $CaO.SiO_2$ hydrate. Alumina containing clays are only capable of supplying a very small amount of aluminum for such purposes. Prior to the present invention it had been found that small amounts of ionizable aluminum compounds up to 0.25% by weight or less, promoted the crystalline formation of tobermorite when asbestos was present. Larger amounts of ionizable aluminum compounds contaminated the crystalline structure and degraded the product. The prior art therefore only utilized alumina containing materials in such amounts as to provide very low concentrations to act as a catalyst, and not under conditions and in amounts to form a partial barrier of retarder for the reaction between the CaO and $SiO_2$. Such a barrier is necessary when cellulose or glass fibers are used to the exclusion of asbestos in a process that includes a gelation step before autoclaving.

At least some of the aluminum hydroxide forming material may be present as gamma alumina and may enter the slurry with the silica or siliceous material. Some of the aluminum hydroxide forming material may also enter the slurry as a soluble salt of aluminum on the cellulose fibers, and usually a purposeful addition of an ionizable aluminum compound will have to be made to the slurry to initiate and speed up the formation of the barrier on the siliceous material. It is believed that the ionizable forms of aluminum plus the hydratable forms of alumina must be present in an amount equal to or greater than approximately 0.30% by weight of batch solids and that the hydratable forms of alumina, such as gamma alumina, must not be contaminated by ions which interfere with the formation of the aluminum hydroxide barrier. As a practical matter it is simpler to determine the amount of ionizable aluminum compound which must be added to the slurry by a gelation test, than it is to perform an analytical test to determine the exact amount of aluminum hydroxide forming material present in the batch forming materials. This may be done by preparing a slurry of the lime and diatomaceous earth in a 4-oz. bottle, shaking the bottle for 5 minutes, and then heating to 194° F. Thereafter the bottle is inverted at 5-minute intervals until the slurry is so thick that it does not run down the sides of the bottle. The total time since heating began is noted. If this total time is 80 minutes or more, a soluble salt of aluminum is added in an amount equal to at least .3% (preferably .36%) of the siliceous material. If this total time is 50 to 80 minutes, .6% (preferably .72%) of a soluble salt of aluminum is added; and if this total time is 30 to 50 minutes, at least 1.0% (preferably 1.08%) of a soluble salt of aluminum is added. If this time is less than 30 minutes, then at least 1½% of a soluble salt of aluminum is added. In those instances where gelation time is excessively long, additions of aluminum hydroxide gel softening ions, as for example sodium and magnesium, can be added. Sodium sulfite is a preferred aluminum hydroxide gel softener which can be used to speed up the calcium silicate gelation when too much hydratable alumina is present.

EXAMPLE 1

A low density hydrated calcium silicate heat insulation material is made from the following materials in parts by weight of solids:

| Materials: | Parts by wt. |
|---|---|
| Hydrated lime | 44.4 |
| Diatomaceous earth (86 sq. ft. per gram) | 22.2 |
| Diatomaceous earth (54 sq. ft. per gram) | 22.2 |
| Wood pulp (sulfate type pulp) | 11.3 |
| Chopped glass fibers | 0.8 |
| Aluminum nitrate | 0.3 |

A dispersion of the various materials is made by dispersing the wood pulp and the aluminum nitrate in 350 parts by weight of water heated to 200° F. in a hydrapulper to produce a dispersion. This dispersion of the wood pulp is then added to a premixer wherein the hydrated lime is added and mixed for 1 minute. Another 900 parts by weight of water at 200° F. is added to another premixer and the diatomaceous earth is added thereto and mixed for 1 minute. Thereafter the contents of the two premixers are added to a gel tank wherein the materials are thoroughly mixed for 10 minutes. The resulting slurry or suspension of ingredients is then permitted to gel quiescently for 10 minutes and is then slowly stirred in the gel tank for 2 minutes. Thereafter the partially formed gel is again allowed to remain quiescent for a period of 10 minutes followed by another period of slow stirring of approximately 2 minutes. The gel so produced is then allowed to sit for 80 minutes before being drawn off in small quantities to a volumetric tank in precise quantities for charging a precision type filter mold shaped to make 3 inch annular pipe insulation of 1½ inch wall thickness and a length of 36 inches. The ram of the mold compresses the gel to force the water out through the cylindrical filter forming the inside surface of the pipe insulation to leave a pipe insulation which is self sustaining and handleable. The block is then removed from the filter mold and is stacked in a rack which when filled is rolled into an autoclave for induration. After the autoclave is sealed, the pressure in the autoclave is raised to 175 p.s.i. over a 30-minute cycle and the blocks are subjected to saturated steam at this pressure for 1½ hours. Thereafter the temperature in the autoclave is raised by heating coils to 600° F. to produce superheated steam which slowly dries the blocks over another 2-hour period. The autoclave is then depressurized over a ½-hour period, and the racks which hold the insulation block are removed from the autoclave. The material so produced has a modulus of rupture of 115 p.s.i. and a density of 12.5 lbs. per cubic foot.

By way of comparison, a prior art material made from asbestos using the same parts by weight of diatomaceous earth and hydrated lime, and devoid of the cellulose fibers and the soluble aluminum material has a modulus of rupture of only approximately 95 p.s.i. The modulus of rupture is determined according to the ASTM Specification C 446–64.

The glass fibers used in the above product are resistant to calcium hydroxide attack. As far as applicants are aware, only zirconia fibers i.e. fibers having 2½% or more of $ZrO_2$ will withstand autoclaving with lime. A $ZrO_2$ content of 2½% may be acceptable in low pressure autoclaving i.e. 175 p.s.i. or less, in high temperature autoclaving i.e. above 450° F., 5% or more may be necessary. Examples of Zirconia glasses are disclosed in British Pat. 1,243,972.

The fibers were made by drawing molten glass from a bushing having 204 orifices therein into individual fibers having a diameter of approximately 0.00055 inch. These individual fibers were coated with an aqueous solution of a water soluble polyvinyl acetate and were gathered into a strand that was coiled into a package and dried. The strand had approximately ½% of polyvinyl acetate thereon based on the weight of the dried coated fibers. These fibers were chopped into ⅝ inch lengths before dispersing in the water.

The wood pulp used above is a chlorine bleached sulfate pulp. Sulfate pulp generally includes approximately .1% of aluminum sulfate thereon. The soluble aluminum sulfate is used in a quantity sufficient to change the basic negative charge on the fibers to a positive charge. This is highly beneficial in that the positively charged fibers disperse readily in water, and are drawn to the negatively charged particles of diatomaceous earth to surround the same. In addition, the positively charged fibers repel the positively charged calcium ions and leave the hydroxyl ions free to migrate to the particles of diatomaceous earth. Cellulose fibers treated with soluble aluminum compounds are therefore a highly desirable form of cellulose fibers for use in the present invention. Other types of cellulose fibers which are treated to become positively charged, are also a preferred fiber material. In those instances where the cellulose fibers are not pretreated before dispersing in the water, cations may be used in the batch formulation to accomplish generally the same result.

EXAMPLE 2

The process of Example 1 is repeated excepting that 0.3 part by weight of aluminum sulfate is substituted for the aluminum nitrate. A product having the same properties as given above in Example 1 is obtained.

EXAMPLE 3

The process of Example 1 is repeated excepting that 2 parts by weight of aluminum chloride is substituted for the aluminum nitrate. A product having generally the same strength as the product given in Example 1 is obtained, but the product is not to be preferred because of the soluble chloride ion present.

EXAMPLE 4

The process of Example 1 is repeated by substituting 3 parts by weight of aluminum oleate for the aluminum nitrate of Example 1. A product having generally the same properties as that given in Example 1 is obtained.

Both cellulose fibers and glass fibers normally have a negative charge in an aqueous media, unless as described above, the fibers are either pretreated with polyvalent cations or such polyvalent cations are added to the aqueous media. The phenomena described above and whereby the dispersed cellulose fibers are drawn around the silica particles can also take place with positively charged glass fibers, as for example where the fibers have a coating of $Al(OH)_3$ gel or $Fe(OH)_3$ gel thereon. Cellulose fibers are one of the few materials that withstand the severe alkali conditions in the autoclave and they therefore perform the functions of suspending the reactants during gelation and providing a reinforcement through autoclaving and use up to approximately 650° F. Above 650° F. the fibers burn out of the insulation material so that the insulation material loses strength at elevated temperatures. Since the principal advantage of calcium silicate hydrate insulation materials is that they are one of the few insulation materials which withstand elevated temperatures, the preferred calcium silicate hydrate insulation materials will also include a fiber reinforcement which does not melt, soften or decompose at 1,000° F.

Applicants have found that a zirconia glass i.e. a glass having more than approximately 2.5% $ZrO_2$, and preferably from 2.5 to 15% $ZrO_2$ by weight is a preferred reinforcement capable of being made into fibers and which will withstand calcium ion attack during autoclaving. The preferred insulation materials therefore will have from .1% to 10% by weight of zirconia glass fibers therein, desirably from .25 to 5%, and most preferably from .5 to 1%. These glass fibers, to be most effective, should be approximately 0.001 inch in diameter or less, and should not be in bundles but should be almost, if not completely, dispersed in the insulation as individual filaments.

The preferred insulation materials will therefore have a density between 10 and 20 pounds per cubic foot and comprise the following materials in percent by weight of solids:

| Materials: | Percent |
| --- | --- |
| Cellulose fibers (dispersible) | 5.0–20 |
| Zirconia glass fibers | 0.1–10 |
| Hydratable and/or soluble aluminum compound | 0.3–2 |
| Fillers | 0–20 |
| Reactive CaO and $SiO_2$ in a ratio of from .75 to 1.05 (preferably a ratio of from .85 to .90) | 60.0–94.6 |

The reactive CaO can be any calcareous material which will supply CaO for combination with $SiO_2$. Quicklime and hydrated lime are commonly used but dicalcium silicates and tricalcium silicates, as for example Portland cement, are also used. The reactive $SiO_2$ can be sand, quartz, diatomaceous earth or any other generally unreacted form of $SiO_2$, but can also be a reacted form, as for example sodium silicate, dicalcium silicate, tricalcium silicate when used to provide some of the $SiO_2$ requirement. The binder produced has the general formula $$4CaO.5SiO_2.5H_2O$$

and is predominantly tobermorite.

The cellulose fibers can be wood pulp, cotton linters, etc. provided the individual fibers are dispersible. These fibers will generally have a diameter less than 30 microns as in the case of cotton fibers and may average less than 1 micron as in the case of wood pulp. The glass fibers will generally have a diameter less than 0.001 inch and also are preferably dispersed in the insulation material as chopped individual fibers having a length from 0.25 to 2.0 inch, desirably from .5 to 1.25 inch and most preferably from .625 to 1.00 inch.

While the invention has been described in considerable detail, we do not wish to be limited to the particular embodiments shown and described, and it is our intention to cover hereby all novel adaptations, modifications and

We claim:
1. In the process of manufacturing low density hydrated calcium silicate heat insulating bodies, the steps of:
   (a) preparing an asbestos free water dispersion of reactive CaO and reactive $SiO_2$ containing materials stabilized with from 5 to 20% by weight of total solids of cellulose fibers having an average diameter of less than approximately 30 micron and from 0.1 to 10.0% by weight of total solids of zirconia glass fibers having a diameter less than approximately 0.001 inch;
   (b) gelling the dispersion by heating at temperatures of approximately 180 to 210° F. for periods of approximately ½ to 3 hours to produce a water containing hydrated calcium silicate gel throughout the dispersion;
   (c) steam autoclaving the dispersion containing the hydrated calcium silicate gel to form calcium silicate hydrates which are stable above 600° F.; and
   (d) in combination with the foregoing steps, the step of purposefully incorporating one or more of the materials from the group consisting of aluminum hydroxide forming materials and aluminum hydroxide gel softening materials to produce a partial barrier between the calcium hydroxide and siliceous materials which permits calcium silicate gel formation during said gelling step while preserving sufficient calcium hydroxide during said gelling step to dissolve the major portion of the remaining siliceous material during said autoclaving step.

2. The process of claim 1 wherein an ionizable aluminum compound is added to the dispersion in an amount of more than 0.36% based on the siliceous material.

3. The process of claim 1 wherein said aluminum compound is aluminum sulfate.

4. In the process of manufacturing low density hydrated calcium silicate heat insulating bodies, the steps of:
   (a) preparing an asbestos free water dispersion of reactive CaO and reactive $SiO_2$ containing materials that include from 5% to 20% by weight of total solids of cellulose fibers having an average diameter of less than approximately 30 microns;
   (b) gelling the dispersion by heating above 180° F. at atmospheric pressure for periods of approximately ½ to 3 hours to produce a water containing hydrated calcium silicate gel throughout the dispersion;
   (c) steam autoclaving the dispersion containing the hydrated calcium silicate gel to form calcium silicate hydrates which are stable above 600° F.; and
   (d) in combination with the foregoing steps, the step of purposefully incorporating one or more of the materials from the group consisting of aluminum hydroxide forming materials and aluminum hydroxide gel softening materials to produce a partial barrier between the calcium hydroxide and siliceous material which permits calcium silicate gel formation during said gelling step while preserving sufficient calcium hydroxide during said gelling step to dissolve the major portion of the remaining siliceous material during said autoclaving step.

5. The process of claim 4 wherein an ionizable aluminum compound is added to the dispersion in an amount of more than 0.36% based on the siliceous material.

6. The process of claim 5 wherein said water dispersion includes zirconia glass fibers having a diameter less than approximately 0.001 inch.

7. The process of manufacturing hydrated calcinum silicate heat insulating bodies comprising:
   (a) preparing an aqueous dispersion of the following materials in percent by weight:

| | |
|---|---|
| Cellulose fibers | 5.0–20 |
| Zirconia glass fibers | 0.1–10 |
| Soluble aluminum compound | 0.30–2 |
| Fillers | 0–20 |
| Reactive CaO and $SiO_2$ in a ratio of from .75 to 1.05 | 60.0–94.6 |

(b) gelling the dispersion between 180° F. and 210° F. for periods of approximately ½ to 3 hours to produce a water containing calcium silicate gel throughout the dispersion; and
   (c) steam autoclaving the dispersion containing the calcium silicate gel to form calcium silicate hydrates which are stable above 600° F.

8. A thermal insulation having a density between 10 and 20 pounds per cubic foot comprising the following materials in percent by weight:

| | |
|---|---|
| Cellulose fibers having a diameter less than 30 micron | 5.0–20 |
| Zirconia glass fibers having a diameter less than 0.001 inch | 0.1–10 |
| Fillers | 0–20 |
| Calcium silicate hydrate that is $4CaO.5SiO_2.5H_2O$ | 60.0–94.6 |
| One or more of the materials from the group consisting of aluminum hydroxide forming materials and aluminum hydroxide gel softening material | 0.3–2 |

References Cited

UNITED STATES PATENTS

| 2,665,996 | 1/1954 | Kalousek | 106—120 |
| 2,699,097 | 1/1955 | Binkley | 92—55 |
| 2,904,444 | 9/1959 | Hoopes et al. | 106—78 |
| 3,472,668 | 10/1969 | Pfeifer et al. | 106—99 |

FOREIGN PATENTS 654,367  6/1951  Great Britain.

JAMES E. POER, Primary Examiner
S. L. BERGER, Assistant Examiner

U.S. Cl. X.R.
106—120